May 12, 1959
G. R. NELSON
2,885,884
TORQUE MEASURING DEVICE
Filed May 14, 1957
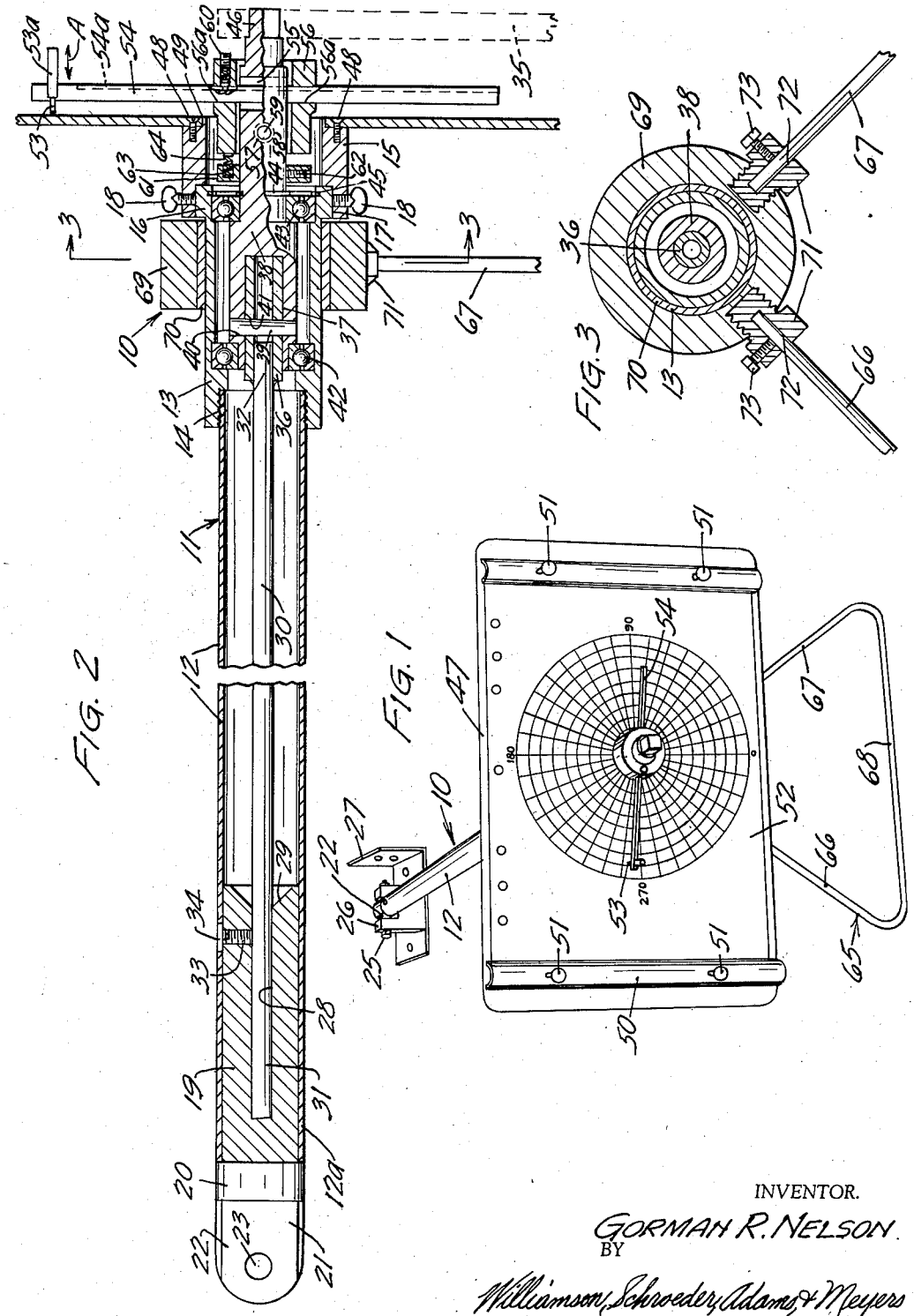
INVENTOR.
GORMAN R. NELSON
BY
Williamson, Schroeder, Adams, & Meyers
ATTORNEYS

United States Patent Office 2,885,884
Patented May 12, 1959

2,885,884

TORQUE MEASURING DEVICE

Gorman R. Nelson, Sioux Falls, S. Dak.

Application May 14, 1957, Serial No. 659,031

6 Claims. (Cl. 73—1)

This invention relates to apparatus for measuring torque and more specifically relates to a torque-measuring device for testing tools and the like.

There are a number of different types of tools which are used to exert a predetermined, specific torque against connecting bolts, nuts, and the like. Some such tools are constructed so that only a single torque output, that is, a specific torque in inch pounds, can be accurately measured. Other of such tools are constructed with one or more yieldable parts through which torque is transmitted and a scale and indicator for showing the amount of torque delivered at the head of the tool. All such tools should be periodically checked so that the torque delivered at the head thereof stays within close tolerances of the torque supposedly delivered or the torque measured by the indicator and scale, as the case may be. Such torquing tools must operate accurately, and must also operate consistently so that all similar bolts or nuts to be tightened will be tightened to the same degree.

The prior art shows some torque-measuring devices employing torsion bars, pendulums, yieldable discs and the like in resisting the torque applied. However, it has been noted that the prior art torque-measuring devices are in general quite complicated and are constructed in such manners that uncontrollable inaccuracies creep into the operation of the machines, resulting in inaccurate torque measurements. Furthermore such known devices are unduly complicated and many of such devices are constructed in manners so that they are inherently necessarily affixed in extremely solid or stationary relation to a pedestal which must be absolute immovable.

An object of my invention is to provide a new and improved torque-measuring device of simple and inexpensive construction and operation.

Another object of my invention is to provide a novel torque-measuring device which is lightweight and easily transported if desired, and is constructed in such a manner that it may be anchored to any type of supporting structure such as a work bench or the like, the yieldability of which does not affect the accuracy of torque measurement.

A further object of my invention is to provide a new and novel torque-measuring device which facilitates accurate comparisons of successive operations of a torquing tool, the accuracy of which is being checked.

A still further object of my invention is to provide an improved torque-measuring device having a yieldable part which is movable from a predetermined reference point for resisting torque applied and which also has an indicating scale which is adjustable in relation to the yieldable part so as to indicate from a predetermined reference, the torque applied to the part.

These and other objects and advantages of my invention will more fully appear from the following description made in connection with the accompanying drawings wherein like reference characters refer to the same or similar parts throughout the several views and in which:

Fig. 1 is a perspective view of the invention;

Fig. 2 is a longitudinal section view of the invention;

Fig. 3 is a detail transverse section view taken on a vertical plane substantially at 3—3 in Fig. 2.

One form of the present invention is shown in the accompanying figures and is described herein. The torque-measuring device is indicated in general by numeral 10 and includes an elongated rigid tubular frame or housing which is indicated in general by numeral 11 and which includes a tubular sleeve member 12, a generally cylindrical bearing housing 13 threadably secured at 14 to the tubular member 12, and a scale mounting member 15 which has an internal cylindrical mounting surface 16 at its rear end which seats upon and is rotatable with respect to an external cylindrical surface 17 at the front end of the bearing housing 13. The scale-mounting member 15 is rotatably adjustable with respect to the bearing housing 13 and tubular member 12, but is normally secured in fixed relation with the bearing housing 13 by means of thumb screws 18 threadably carried in the rear end of member 15 and bearing against the surface 17 of the bearing housing 13.

Means are provided for attaching the rear end portion 12a of the tubular member 12 to a stationary structure such as a work bench, wall or the like, and in the form shown, such means include a cylindrical anchoring member 19 which is affixed in the rear end 12a of tubular member 12 as by braizing or the like. The anchoring member has an enlarged collar 20 which bears against the annular end surface of the tubular member 12, and the anchoring member 19 also has an attachment portion 21 with flattened side surfaces 22 and an aperture 23 therethrough for receiving and carrying an anchoring bolt 25 which projects through a bifurcated and apertured mounting member 26 which is affixed to a suitable bracket 27 adapted for attachment as by bolts to a stationary structure such as a work bench, wall or the like.

The anchoring member 19 has an elongated bore hole 28 opening through the inner end thereof and the inner end of the anchoring member 19 is cambered at 29 to provide a generally conical outer end portion of the bore hole 28.

The torque-measuring device 10 is also provided with an elongated yieldable torsion bar or member 30, the opposite ends 31 and 32 of which are relatively rotatable under the influence of torque applied thereto and on an axis extending longitudinally of the torsion bar 30. The rear end 31 of torsion bar 30 is mounted on the anchoring member 19 and projects into the hole 28. The rear end 31 of the torsion bar 30 is affixed in the hole 28 by any suitable means and in the form shown such means include a set screw 33 in the anchoring member 19 and bearing against the rear end 31 of the torsion bar 30. A suitable aperture 34 is provided in the tubular member 12 to provide access to the set screw 33.

The front end 32 of the torsion bar 30 is rotatably mounted in the front end portion of the housing 11 and is provided with means adapted for releasable coupling with a torquing tool which is indicated in dotted lines at 35. The front end 32 of torsion bar 30 is affixed by any suitable means such as braizing in a mounting sleeve 36 which is affixed in a bore hole 37 in the rear end of shaft 38 by any suitable means such as the tapered wedging pin 39 which projects through suitably formed and aligned apertures 40 and 41 in the shaft 38 and sleeve 37 respectively. Shaft 38 is rotatably mounted in the bearing housing 13 by means of a pair of ball bearings 42 and 43 respectively which are retained in the desired position relative to the bearing housing 13 and shaft 38 by cooperating shoulder surfaces on the housing and shaft and by retaining rings 44 and 45 on the housing 13 and shaft 38 respectively. The outer end of shaft 38 is reduced and squared at 46 to facilitate coupling of a torquing tool 35 thereto for rotating the forward end 32 of the torsion bar 30.

Means are provided for defining a markable arcuate scale on the front end of the housing 11 and in the form shown such means include a substantially rigid plate or board member 47 affixed by any suitable means such as screws 48 to the forward end of the scale mounting member 15. The board member 47 is, of course, apertured at 49 to receive the front end of shaft 38 therethrough and has a pair of chart or graph-clamping members 50 at the opposite ends thereof and secured thereto as by thumb screws 51 which tighten members 50 against the board and secure the removable paper chart or graph 52 thereon.

Means are also provided in the torque-measuring device for producing an indicating mark on the scale showing the arc through which the front end of the torsion bar is rotated by a tool applied thereto. In the form shown, such means include an indicator which comprises a stylus in the form of a ball point pen 53 having the usual filler tube 53a which is carried by an elongated rigid stylus arm 54. The pen 53 is mounted in the arm 54 by any suitable means and may be wedged therein. Arm 54 has an elongated linear groove 54a extending from the lower end thereof into immediate proximity with the pen 53. Arm 54 extends substantially normal to the shaft 38 and projects through a generally oblong opening 55 therein. The opening 55 is slightly larger than the outside diameter of arm 54 at least in the longitudinal direction of shaft 38 so as to permit swinging of arm 54 inwardly and outwardly in relation to the scale and in the direction of arrow A.

Means are provided for mounting the stylus arm 54 to permit the same to swing about an axis transverse to the shaft rotation axis and to permit adjusting movement of the stylus arm in a generally radial direction relative to shaft 38, but to hold the stylus arm 54 in non-rotatable relation with respect to the shaft 38 with reference to axes parallel to the shaft rotation axis. In the form shown, such means comprise a cylindrical, sleeve-type stylus holder or mounting 56 having a pair of diametrically aligned stylus-receiving apertures 56a therein and through which the stylus arm 54 extends. The stylus holder 56 is mounted concentrically of shaft 38 and has an internal diameter substantially larger than the external diameter of the shaft. The stylus mounting 56 has a second pair of diametrically aligned apertures 56b having a common axis which is normal to the shaft rotation axis and also normal to the common axis of the stylus mounting apertures 56a. The apertures 56b have brass bushings 57 affixed therein by a sweat fit. The shaft 38 has a mounting aperture 58 in alignment with the sleeve-type bushings 57 and a pivot pin 59 is inserted through the aligned bushings 57 and apertures 58 whereby to hold the mounting 56 non-rotatable on shaft 38 in relation to the longitudinal rotation axis of shaft 38, and whereby to permit swinging of the mounting 56 on pin 59 and about an axis transverse to the shaft rotation axis. A set screw 60 is carried in the end of mounting 56 and the set screw 60 projects into the groove 54a of stylus arm 54 to permit ready and easy radial movement of the stylus arm and thereby facilitate radial adjustment of the stylus or pen 53.

Means are provided for normally biasing the pen 53 in outwardly swung position relative to the scale paper 52 and in the form shown, such biasing means include an annular spring mounting 61 fixed on the shaft 38 by means of a set screw 62 and having a forwardly opening recess 53 in opposed relation with the rear end of the mounting 56. A biasing spring 64 is seated in the recess 63 and bears against the rear end of stylus mounting 56 at the upper side thereof for normally urging the mounting 56 in a clockwise direction and swinging the stylus or pen 53 outwardly from the scale.

The torque-measuring device 10 is also provided with means supporting the front end of the housing 11 and permitting free rotation of the housing 11 to permit the scale to turn when the stationary structure such as the work bench to which the rear end of the housing is connected, yields under the influence of applied torque.

In the form shown, such support means comprise a leg structure which is indicated in general by numeral 65 and which includes a pair of generally depending leg members 66 and 67 which extend obliquely outwardly and downwardly from bearing housing 13. In the form shown the legs 66 and 67 are formed integrally of each other and are interconnected by a common floor-engaging portion 68. An outer bearing housing or leg mounting 69, in the form of a rigid annulus encompasses the outer surface of bearing housing 13 and a suitable rotary bearing 70 is disposed between the leg mounting 69 and the bearing housing 13. The upper ends of the legs 66 and 67 are affixed to the mounting 69 by means of bushings 71 which are rotatably secured to the leg mounting 69 and have central leg-receiving apertures 72 therein into which the upper ends of the legs are projected and are secured therein by means of set screws 73.

In operation, the rear end of housing 11 is secured to stationary structure such as a work bench, wall or the like. The front end portion of the housing is supported by the depending legs which are disposed at approximately sixty degrees with each other, and which engage a floor or other available supporting surface. It should be noted that the mounting 26 for the rear end of the housing permits at least limited vertical swinging of the housing so as to permit the attachment bracket 27 to be secured in a convenient location, and to still permit the leg structure 65 to engage the supporting surface. The torque-measuring device will normally be oriented in a generally horizontal position.

When a tool is to be checked for accuracy, a new chart or graph 52 will be applied onto the board 47 and clamped thereon by means of the clamping members 50. In applying the chart or graph 52 to the board, it is necessary to loosen the stylus arm-holding set screw 60 and to slip the stylus arm and pen 53 out of the mounting 56. When the chart or graph has been properly positioned on the board 57, the stylus arm 54 will be replaced and the pen 53 will be adjusted to the proper radial position so as to produce markings on the graph in the desired location.

The pin 53 will then have a predetermined starting or reference position and normally will rate to that position. In order to set up a proper reference point on the chart 52, it may be necessary to loosen the thumb screw 18 and threadably adjust the position of the board 47 and chart 52 so that the refernce point or zero position of the chart corresponds with the initial position of the pen 53. When the board 47 is adjusted the thumb screw 18 will again be tightened so as to normally hold the scale or chart in a fixed position on the front end of the housing 11.

The tool 35 to be checked will then be applied onto the squared end portion 46 of shaft 38. Torque is then applied through the tool 35 and through the shaft 38 to the front end 32 of the torsion bar 30, causing rotation of the front end of the torsion bar 32 and a corresponding swinging of the stylus arm 54 which causes the pen 53 to circumscribe an arc relative to the chart 52. Of course the pen 53 will be brought to bear against the chart 52 so as to properly mark the chart as the pen moves through its arc of movement. When torque is applied onto the front end 32 of torsion bar 30, a torque is also transmitted from the rear end 31 of the bar 30 to the anchor 19 and the rear end of housing 11. This torque applied through the rear end of housing 11 will tend to cause rotation of the housing 11 on its own longitudinal axis, and if the stationary structure or the mounting for the rear end of housing 11 yields to permit the housing to rotate, the housing will actually rotate relative to the leg structure 65 and will cause the scale mounting board 47 and chart 52 to rotate through an arc identical to the rotational arc of the rear end portion 12a of the tubular member 12. It will therefore be seen that only the differential rotation of the front end 32 of the torsion bar 30, in relation to the rear end 31 thereof, is indicated or measured by the stylus or pen 53 on the scale. The yielding of the stationary structure or mounting for the rear end of the housing 11 is completely corrected so that the scale indication is a true measure of the torque applied by the tool 35.

If the tool 35 is of the type which has a yieldable part and a scale and pointer to indicate to the operator the torque being applied by the tool, torque is applied through the tool until the scale and indicator on the tool indicate that a certain predetermined torque (such as X inch pounds) and the torque actually being delivered to the shaft 38 is indicated on the chart 52. The reading on the chart 52 should of course be X inch pounds, but if the tool is defective, the reading on the chart 52 will be different and the error in the tool will be detected. As the chart 52 is marked, the pen 53 may be allowed to swing away from the chart and torque will be removed from the tool. The pen 53 may then be adjusted radially inwardly and then be again tightened by the set screw 60. Torque in the amount of X inch pounds (on the tool scale) will then be re-applied so as to produce a second indication on the chart 52. The continuity of operation of the tool is thereby checked. Subsequently the pen 53 may be moved radially inwardly to provide other successive continuity checks. When the tool 35 has been checked out for accuracy and continuity at X inch pounds as measured by its own scale, it may be desirable to check the tool 35 at other scale ratings on its own scale, such as Y inch pounds and Z inch pounds. To facilitate such additional checking of the operation of tool 35, it is of course possible to apply a new chart 52 onto the board 47. However, it is preferable that all of the records regarding a single tool be kept on a single chart. The thumb screw 18 may again be loosened and the board 47 and chart 52 may be rotated to establish a new reference point on the chart corresponding to the initial position of the stylus or pen 53. The thumb screw will again be tightened and checking of the tool for accuracy and continuity of operation when delivering Y inch pounds on its own scale, may proceed in the fashion hereinbefore set forth with regard to the checking at X inch pounds.

Subsequently the position of the scale may be adjusted again by rotating the board 47 and chart 52 for checking the tool when the tool delivers Z inch pounds by its own scale.

Of course some torquing tools are constructed in such a fashion that when operated, they will apply a predetermined torque and will then slip or otherwise disengage so that additional torque may not be trasmitted. These types of tools may also be checked on this torque-measuring device 10 by coupling the same to the squared end portion 46 of shaft 38 and then operating the tool to produce a scale reading on the chart 52 and determine whether or not the tool delivers the rated torque output.

It will be seen that I have provided a new and improved torque-measuring device which is anchored at only one location to a stationary structure such as a work bench, wall or the like, and which is constructed to compensate for any inaccuracies which might be produced by exerting of the stationary structure by permitting the scale to freely turn in proportion to the yielding of the structure to which the torque-measuring device is attached.

It will also be seen that I have provided a novel torque-measuring device facilitating ready and easy comparison between successive operations of the tool being checked so as to determine the continuity of operation of the torquing tool.

It will, of course, be understood that various changes may be made in the form, detail, arrangement and proportion of the parts without departing from the scope of my invention which consists of the matter described herein and set forth in the appended claims.

What is claimed is:

1. A torque-measuring device for attachment to stationary structures such as work benches, walls and the like, comprising a rigid tubular frame to be normally oriented in a generally horizontal position, means connecting the rear end of the frame to such a stationary structure whereby to prevent rotation of the frame on longitudinal axes relative to the structure, an elongated, yieldable torsion member extending longitudinally through the frame and having relatively rotatable front and rear ends, said torsion member having the rear end thereof non-rotatably connected to the rear end of the frame, rotary bearing means interconnecting the front end of the torsion member and the front end of the frame and permitting relative rotation therebetween on an axis longitudinal of the torsion member, said torsion member having means at the front end thereof releasably coupling a torquing tool thereto, an arcuate scale affixed on the front end of the frame, an indicator positioned adjacent the scale for cooperation therewith and mounted on the front end of the torsion member for rotation therewith when torque is applied by such a tool, and floor-engaging support means for the front end of the frame and having rotary bearing connection with the front end of the frame to permit rotation of the frame on an axis longitudinal of the frame, whereby the frame is permitted to rotate at said floor-engaging support means to rotate the scale in response to torque applied at the front end of the torsion member which may cause some yielding of the stationary structure to which the frame is secured, and thereby cause the torque applied to be accurately measured at the scale and indicator.

2. A torque-measuring device for attachment to stationary structures such as work benches, walls, and the like, said device comprising a rigid elongated frame normally oriented in a generally horizontal position and having means connecting the rear end of the frame to such a stationary structure whereby to prevent rotation of the frame on a longitudinal axis, an elongated, yieldable torsion member having relatively rotatable front and rear ends, said torsion member extending longitudinally along the frame and having the rear end of said torsion member non-rotatably connected to the rear end of the frame, the torsion member having means at the front end thereof adapted for releasable coupling to a torquing tool, an arcuate scale and a cooperating indicator, one having connection with the front end of the frame and the other having connection with the front end of the torsion member and one of said connections being rotatably adjustable whereby to facilitate accurate measurement of the rotation of the front end of the torsion member from a predetermined reference when torque is applied thereto, and support means having rotatable connection with the front end of the frame to permit rotation thereof on longitudinal axes, whereby torque applied by the tool is accurately indicated on the scale without regard to yielding of the stationary structure.

3. The invention set forth in claim 2 wherein said arcuate scale has rotatably adjustable connection with the front end of the frame and wherein said indicator has non-rotatable connection with the front end of the torsion member.

4. A torque-measuring device for attachment to stationary structures such as work benches, walls and the like, said device comprising an elongated rigid frame, means connecting the rear end of the frame to such a stationary structure whereby to prevent rotation of the frame on longitudinal axes, an elongated yieldable torsion member having relatively rotatable front and rear ends, said torsion member extending along the frame and having the rear end thereof non-rotatably connected to the rear end of the frame, the front end of the torsion member having rotatable connection with the frame and also having means releasably coupling a torquing tool thereto, a markable arcuate scale and a cooperating scale-marking indicator, one having non-rotatable connection to the front end of the frame and the other having non-rotatable connection to the front end of the torsion member, whereby to indicate the rotation of the front end of the torsion member when torque is applied thereto, said indicator being adjustable inwardly and outwardly in relation to the rotation axis of the torsion member to thereby facilitate production of juxtaposed markings on the scale for comparison with each other to check accuracy continuity during successive operations of the tool, and support means mounting the front end of the frame.

5. A torque-measuring device for attachment to stationary structures such as work benches, walls and the like, said device comprising an elongated rigid frame, means connecting the rear end of the frame to such a stationary structure whereby to prevent rotation of the frame on longitudinal axes, an elongated, yieldable torsion member having relatively rotatable front and rear ends, said torsion member extending along the frame and having the rear end thereof non-rotatably connected to the rear end of the frame, the front end of the torsion member having means for releasably coupling a torquing tool thereto, a markable arcuate scale secured to the front end of the frame, a marking indicator disposed adjacent the scale for marking the same, a mounting connected with the front end of the torsion member and being movable, but non-rotatable on longitudinal axes relative to the front end of the torsion member, said mounting carrying the indicator for movement toward and away from the scale, and said mounting having means releasably connecting the indicator thereto and facilitating adjustment of the indicator inwardly and outwardly in relation to the rotation axis of the torsion member, and support means connected with the front end of the frame.

6. The invention set forth in claim 5 wherein said mounting is swingable on an axis transverse to the rotation axis of the torsion member whereby to facilitate swinging of the indicator into and out of marking engagement with the scale.

References Cited in the file of this patent

UNITED STATES PATENTS

| | | |
|---|---|---|
| 2,400,978 | Collins | May 28, 1946 |
| 2,441,608 | Warner | May 18, 1948 |
| 2,486,632 | Burke et al. | Nov. 1, 1949 |
| 2,497,756 | Billeter | Feb. 14, 1950 |

FOREIGN PATENTS

| | | |
|---|---|---|
| 745,891 | Germany | Dec. 2, 1944 |